(12) United States Patent
Zhang et al.

(10) Patent No.: US 11,002,589 B1
(45) Date of Patent: May 11, 2021

(54) MULTI-LANE WEIGHT MEASURING DEVICE

(71) Applicant: AMAZON TECHNOLOGIES, INC., Seattle, WA (US)

(72) Inventors: Zihui Zhang, Seattle, WA (US); Nicholas Mendenhall, Kirkland, WA (US); Sydney Tye Minnis, Seattle, WA (US); Nicholas Franklin, Maple Valley, WA (US); Venkata Srikiran Bodapati, Snoqualmie, WA (US); Nathan Pius O'Neill, Snohomish, WA (US); Jacob Siegel, Marlborough, MA (US); Nicholas McMahon, Bolton, MA (US); James Olney, Oxford, MA (US); Jeremy De Bonet, Southborough, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 200 days.

(21) Appl. No.: 16/217,982

(22) Filed: Dec. 12, 2018

(51) Int. Cl.
*G01G 19/14* (2006.01)
*G01G 19/52* (2006.01)
*G06Q 10/08* (2012.01)

(52) U.S. Cl.
CPC .............. *G01G 19/52* (2013.01); *G01G 19/14* (2013.01); *G06Q 10/087* (2013.01)

(58) Field of Classification Search
CPC ........ G01G 21/28; G01G 19/52; G01G 19/14; G06Q 10/087
See application file for complete search history.

(56) References Cited

U.S. PATENT DOCUMENTS

| | | | | |
|---|---|---|---|---|
| 4,453,607 A | * | 6/1984 | Zink | G01G 21/23 177/179 |
| 5,294,756 A | * | 3/1994 | Lauber | G01G 11/04 177/119 |
| 6,803,529 B2 | * | 10/2004 | Takahashi | B65G 15/00 177/119 |
| 7,225,980 B2 | | 6/2007 | Ku et al. | |
| 7,949,568 B2 | | 5/2011 | Fano et al. | |
| 8,009,864 B2 | | 8/2011 | Linaker et al. | |
| 8,189,855 B2 | | 5/2012 | Opalach et al. | |
| 8,630,924 B2 | | 1/2014 | Groenevelt et al. | |

(Continued)

OTHER PUBLICATIONS

Asthana, et al. "An Indoor Wireless System for Personalized Shopping Assistance" CiteSeerX, In Proceedings of IEEE Workshop on Mobile Computing Systems and Applications, 1994. Retrieved from the Internet: <http://citeseerx.ist.psu.edu/viewdoc/summary?doi=10.1.1.127.3033&rank=1>.

(Continued)

*Primary Examiner* — Randy W Gibson
(74) *Attorney, Agent, or Firm* — Lindauer Law, PLLC

(57) ABSTRACT

A fixture includes a plurality of brackets. Accessories such as wire hooks, shelves, bins, and so forth may be supported by one or more brackets. A load cell supports each bracket and generates a signal that is indicative of changes to the bracket as items are added or removed from the accessory. The brackets include features such as tabs that prevent accessories from moving laterally. The fixtures are easily reconfigured to accommodate accessories of different sizes that in turn may support items of different sizes.

20 Claims, 11 Drawing Sheets

(56) References Cited

U.S. PATENT DOCUMENTS

| | | | | |
|---|---|---|---|---|
| 8,853,568 | B2* | 10/2014 | Shinozaki | G01G 3/16 177/239 |
| 9,235,928 | B2 | 1/2016 | Medioni et al. | |
| 9,473,747 | B2 | 10/2016 | Kobres et al. | |
| 10,718,657 | B2* | 7/2020 | Vasconcelos | G01G 21/28 |
| 10,760,947 | B1* | 9/2020 | Gyori | G01G 21/28 |
| 2011/0011936 | A1 | 1/2011 | Morandi et al. | |
| 2012/0284132 | A1 | 11/2012 | Kim et al. | |
| 2013/0284806 | A1 | 10/2013 | Margalit | |
| 2015/0086107 | A1 | 3/2015 | Dedeoglu et al. | |

OTHER PUBLICATIONS

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet<http://www.researchgate.net/publication/221568350_How_to_nudge_in_Situ_designing_lambent_devices_to_deliver_salient_information_in_supermarkets>.

Pop, Cristian, "Introduction to the BodyCom Technology" AN1391, DS01391A, Microchip Technology, Inc., May 2, 2011. Retrieved from the Internet: <http://www.microchip.com//wwwAppNotes/AppNotes.aspx?appnote=en555156>.

Vu, et al., "Distinguishing Users with Capacitive Touch Communication" WINLAB, Rutgers University, In proceedings of: The 18th Annual international Conference on Mobile computing and networking. pp. 197-208. Aug. 2012. Retrieved from the Internet: <http://www.winlab.rutgers.edu/~janne/capacitivetouch_mobicom12.pdf>.

* cited by examiner

MULTI-LANE WEIGHT MEASURING DEVICE

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
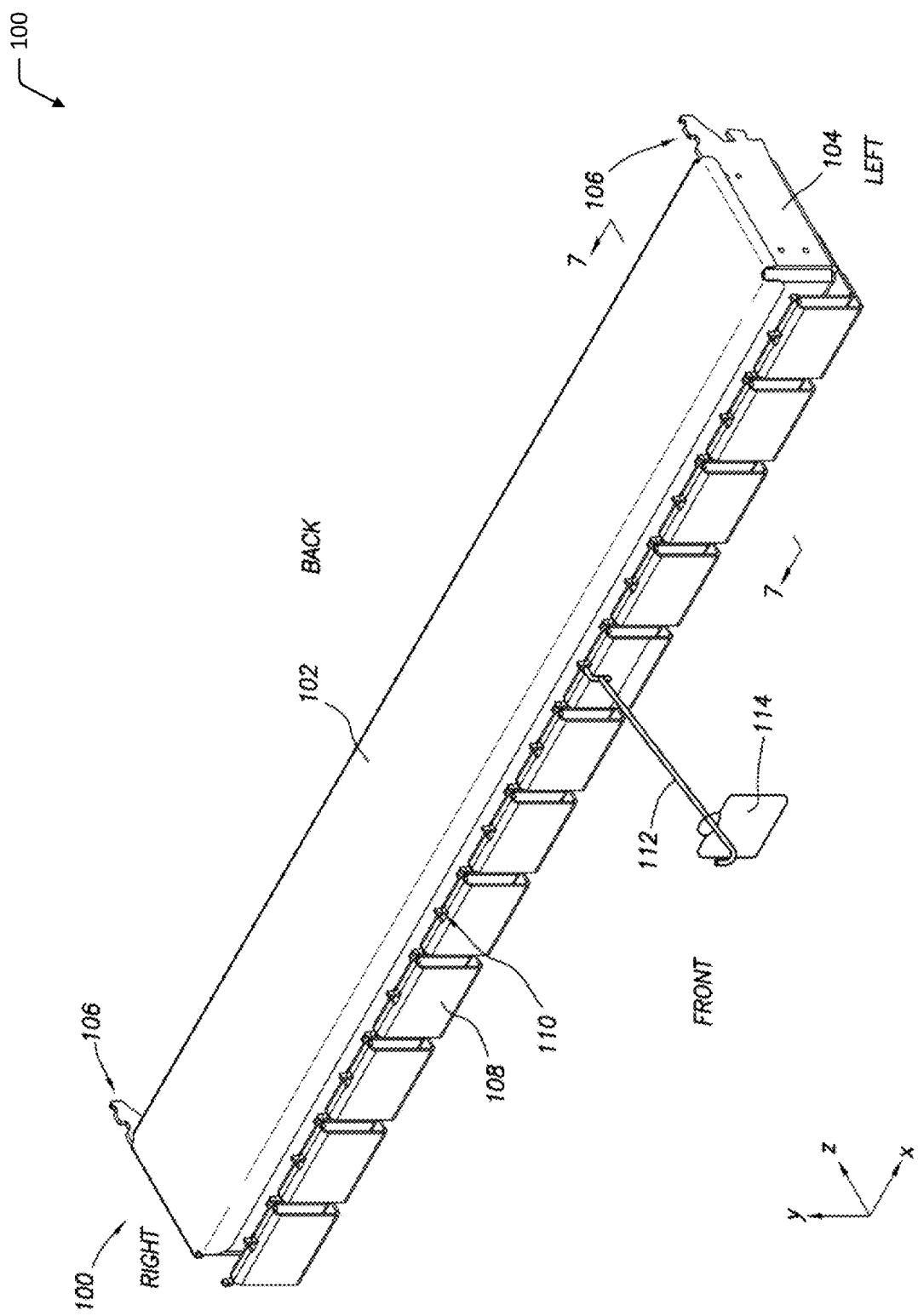
FIG. 1 illustrates a perspective view showing a front of a multi-lane weight measuring device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures that are used to stow or otherwise hold items. Items may be arranged into lanes. For example, a set of the same type of item that extends from the front of a fixture to the back may be deemed a lane. The fixtures, such as gondolas or racks, are equipped with a multi-lane weight measuring device that generates weight data. The multi-lane weight measuring device may include one or more weight sensors and associated electronics. During operation, the multi-lane weight measuring device generates weight data and sends that weight data using a communication interface to another device, such as a server.

A fixture may contain one or more of the multi-lane weight measuring devices. For example, a gondola may have six multi-lane weight measuring devices affixed to it. Each multi-lane weight measuring device includes a plurality of brackets. The weight on each bracket is measured by at least one load cell. Each bracket comprises one or more accessory support features. For example, the accessory support feature may comprise a portion of the bracket that extends upwards.

An accessory provides physical support for one or more items and is configured to engage at least a portion of the accessory support feature. For example, the accessory may include a shelf, bin, hanger, and so forth. The accessory includes one or more bracket engagement features. The bracket engagement features are configured to engage at least a portion of the accessory support feature and hold the accessory with respect to the bracket. The accessory is thus supported, at least in part, by the bracket, and weight on the bracket is measured by the one or more weight sensors associated with the bracket. The weight sensors provide data that is indicative of the weight on the accessory. In some implementations each bracket may have a separate accessory. Each accessory in turn may support a single type of item. In other implementations a single accessory may be supported by two or more brackets.

In one implementation, the multi-lane weight measuring device comprises a housing. For example, the housing may comprise a rectangular box shape with five sides and an open top. Within the housing is a mounting surface that is raised with respect to a bottom of the housing. For example, the mounting surface may comprise an embossed feature in the material of the housing. A plurality of weight sensors in the housing are affixed to the surface, such that each weight sensor has a first end attached to the surface and a second end that is aligned with a hole in the housing. A first end of each bracket is affixed to a second end of individual weight sensors. The first end of the bracket may include a feature, such as an embossed protrusion, that extends through the hole and up into the housing where the feature is affixed to the second end of the individual weight sensor. Shelf hooks may extend from the back of the housing, allowing the multi-lane weight measuring device to be attached to a gondola, rack, or other support. The device may include circuitry within the housing that generates weight data based on output from the weight sensors. A cover may be placed on the housing, concealing and protecting interior components from contaminants.

In some implementations, the housing, surface and the shelf hooks may comprise a single piece of material. For example, a first piece of steel may be cut to an overall shape, stamped to produce the mounting surface, and bent to form the rectangular box shape. A second piece of steel may be cut and bent to form the cover.

In some implementations the brackets may comprise a single piece of material. For example, a first piece of steel may be cut to an overall shape, bent to form the accessory support feature, and stamped to produce a protrusion. The protrusion may then extend up through the hole in the housing and be affixed to the second end of the weight sensor.

The facility may include, or have access to, an inventory management system. The inventory management system may use data from the sensors at or near the fixture, such as the weight data from the multi-lane weight measuring devices, to determine interactions in the facility. Interactions may comprise the user picking an item from a fixture, placing an item at a fixture, touching an item, and so forth. For example, the inventory management system may generate interaction data that indicates what type and quantity of item a user picked from a particular part of the fixture, and then use this interaction data to adjust the count of inventory stowed at the particular fixture.

The multi-lane weight measuring device described in this disclosure provides several significant advantages. The ability to gather weight data associated with a particular lane as supported by a particular bracket allows for specific information as to the location of the weight change to be determined. For example, the weight change data for a change in weight at a particular bracket may be generated. The inventory management system may look up which type of item is associated with that particular bracket, and determine a quantity of that type of item that was picked or placed. As a result, overall accuracy of the inventory management system is improved.

The multi-lane weight measuring device is highly modular, allowing for significant flexibility during deployment and reconfiguration. For example, the accessory support feature on the brackets allows a wide variety of different types of accessories to be attached without the use of tools and without removing the device from service. Accessories of different sizes may be comingled on a single device, such as having single lane hangers, each supported by a separate bracket, or multi-lane accessories such as a shelf that spans across six brackets. The device may also be constructed to comply with food safety regulations, allowing for use with edible items.

The unit is relatively inexpensive to manufacture, comprising a minimal number of different pieces. The device is mechanically rugged and able to withstand the stresses associated with use in a commercial environment.

By using the devices and techniques described herein, operation of the facility may be improved. For example, the inexpensive and modular devices may be installed and reconfigured to meet changing types or arrangements of items. The devices provide accurate weight data with a location resolution down to a particular lane, that may be used for inventory management. The devices also use a relatively small volume, maximizing the amount of storage space available for items.

Illustrative System

FIG. 1 illustrates a perspective view showing a front of a multi-lane weight measuring device (device) 100, according to some implementations. A cover 102 is shown atop a housing 104. The housing 104 may have an overall shape of a rectangular parallelepiped with five sides, the top side being open and covered by the cover 102 when the device 100 is assembled.

One or more shelf hooks 106 extend away from a back side of device 100 from the left and right ends of the housing 104. In one implementation the shelf hooks 106 may be integral with at least a portion of the housing 104. In another implementation, the shelf hooks 106 may be separate pieces that are affixed to the housing 104 or another portion of the device 100. The shelf hooks 106 may have a shape and relative distance from one another that are compatible with upright supports. For example, the shelf hooks 106 may allow the device 100 to be mounted to, and supported by, uprights on a gondola shelving unit (not shown).

The housing 104 and the shelf hooks 106 may comprise a single piece of material. For example, a first piece of steel may be cut to an overall shape, stamped to produce the mounting surface, and bent to form the rectangular box shape. A second piece of steel may be cut and bent to form the cover 102.

The device 100 includes a plurality of brackets 108. These brackets extend from underneath the bottom of the housing 104 and past a front edge of the housing 104. The end of the bracket 108 that is in front of the housing 104 includes an accessory support feature. The end of the bracket 108 may also include one or more lateral retention features 110, such as a tab that extends upward from the accessory support feature. The accessory support feature is described in more detail below with regard to FIG. 7.

An accessory 112 may be supported by one or more of the brackets 108. The accessory 112 may comprise one or more of a hook, bin, basket, shelf, autofacing unit, or dispenser. For example, the accessory 112 may comprise a wire hook (as shown here), and items 114 may be hung from the hook during use.

To prevent the accessory 112 from sliding laterally with respect to the housing 104 (left to right), the accessory 112 may include a bracket engagement feature that interacts with the lateral retention feature 110 to prevent such motion. For example, the bracket engagement feature of the accessory 112 may include a hole, through which the lateral retention feature 110 protrudes when the accessory 112 is supported by the bracket 108. The bracket engagement feature is described in more detail below with regard to FIG. 7.

In this illustration twelve brackets 108 are depicted. Other implementations may have a larger or smaller number of brackets 108. An individual accessory 112 may span several brackets 108 while being supported by one or more of the brackets 108. For example, if each bracket 108 is 3 inches wide, and a shelf accessory 112 is 9 inches wide, the shelf accessory 112 may span three brackets 108. Continuing the example, to avoid overconstraining the motion of the accessory 112, the shelf accessory 112 may be supported by only one or two brackets 108, and not transfer a vertical load onto the remaining spanned brackets 108.

As described in this disclosure, components may be affixed or otherwise joined to one another in several ways. For example, two components may have complementary features that mechanically engage one another, such as a tab and corresponding slot. In another example, fasteners such as rivets, bolts, screws, cams, and so forth may be used. In yet another example two or more components may be affixed or otherwise joined using adhesives, welding, and so forth.

Figure 2:
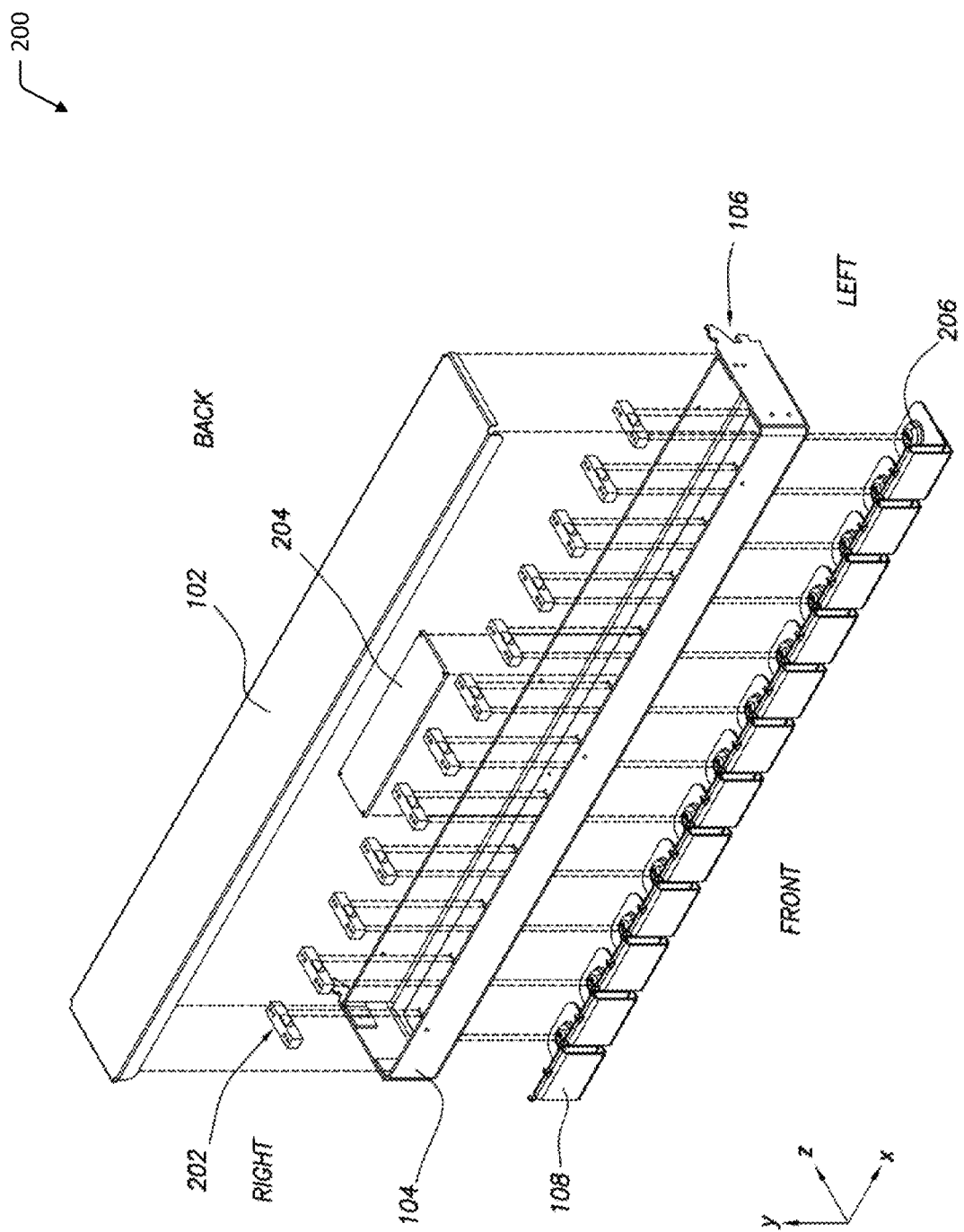
FIG. 2 illustrates an exploded view showing the front of the multi-lane weight measuring device, according to some implementations.

FIG. 2 illustrates an exploded view 200 showing the front of the multi-lane weight measuring device 100, according to some implementations. As shown, within the housing 104 are a plurality of weight sensors 202. These weight sensors 202 may be connected to circuitry 204 that generates weight data based on output from the weight sensors 202.

An inventory management system may use the weight data and information about which weight sensor 202 provides the weight data to determine a change in the quantity of items, determine a location of an item, maintain shipping records, and so forth. The inventory management system is discussed in more detail with regard to FIG. 9.

The weight sensors 202 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 202 may operate as transducers that generate one or more signals based on an applied force, such as that of the load due to gravity. For example, the weight sensor 202 may comprise a strain gauge and a structural member that deforms slightly when weight is applied. The strain gauge may be bonded to or otherwise affixed to the structural member. As weight is applied, the structural member is deformed, which also results in deformation of the strain gauge. By measuring a change in the electrical characteristic of the strain gauge, such as capacitance or resistance, the weight may be determined. For example, a lookup table may relate a particular electrical resistance value to a particular weight. In another example, the weight sensor 202 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations the weight sensor 202 may comprise a single point load cell.

The weight sensor 202 may have a first end and a second end. The first end of the weight sensor 202 is affixed to a mounting feature of the housing 104. The second end of the weight sensor 202 is affixed to a protrusion 206 on a first end of the bracket 108. The protrusion 206 extends upward from an upper surface of the bracket 108 and may extend through a hole or other opening into the housing 104. In other implementations the second end of the weight sensor 202 may extend downwards through the hole in the housing 104 to be affixed to the first end of the bracket 108. In another implementation, instead of a protrusion 206, a spacer may be used between the second end of the weight sensor 202 and the first end of the bracket 108.

The weight sensor 202 may have a long axis that extends along the first end and the second end. The long axis may be aligned along a center line of the bracket 108, and a subsequent accessory 112 that is attached to the bracket 108. For example, the long axis of a weight sensor 202 may extend along and through the long axis of the wire hook accessory 112 shown in FIG. 1.

The long axis of the weight sensors 202 may be perpendicular to the long axis of the housing 104. For example, the long axis of the housing 104 may extended left and right while the long axis of individual weight sensors 202 extends front to back. In some implementations, such as shown here, the long axes of the weight sensors 202 may be parallel to another.

In other implementations, different weight sensors 202 may be aligned in different directions within the housing 104. For example, the angle between the long axis of the housing 104 and the long axes of the weight sensors 202 may be between 5 and 85 degrees. By placing the weight sensors 202 such that their long axes are not perpendicular to the long axis of the housing 104, the overall depth or distance from front to back of the housing 104 may be reduced.

While a single weight sensor 202 is depicted as supporting each bracket 108, in some implementations a plurality of weight sensors 202 may be used to support an individual bracket 108. For example, two weight sensors 202 may be affixed to an individual the bracket 108.

In some implementations the weight sensors 202 used within the device 100 may have the same specifications. For example, each weight sensor 202 may have a maximum load rating of 20 kilograms (kg). In other implementations other weight sensors 202 with different capacities may be installed within the same housing 104. For example, six of the weight sensors 202 may have a maximum load rating of 20 kg while six of the weight sensors have a maximum load rating of 40 kg.

Figure 3:
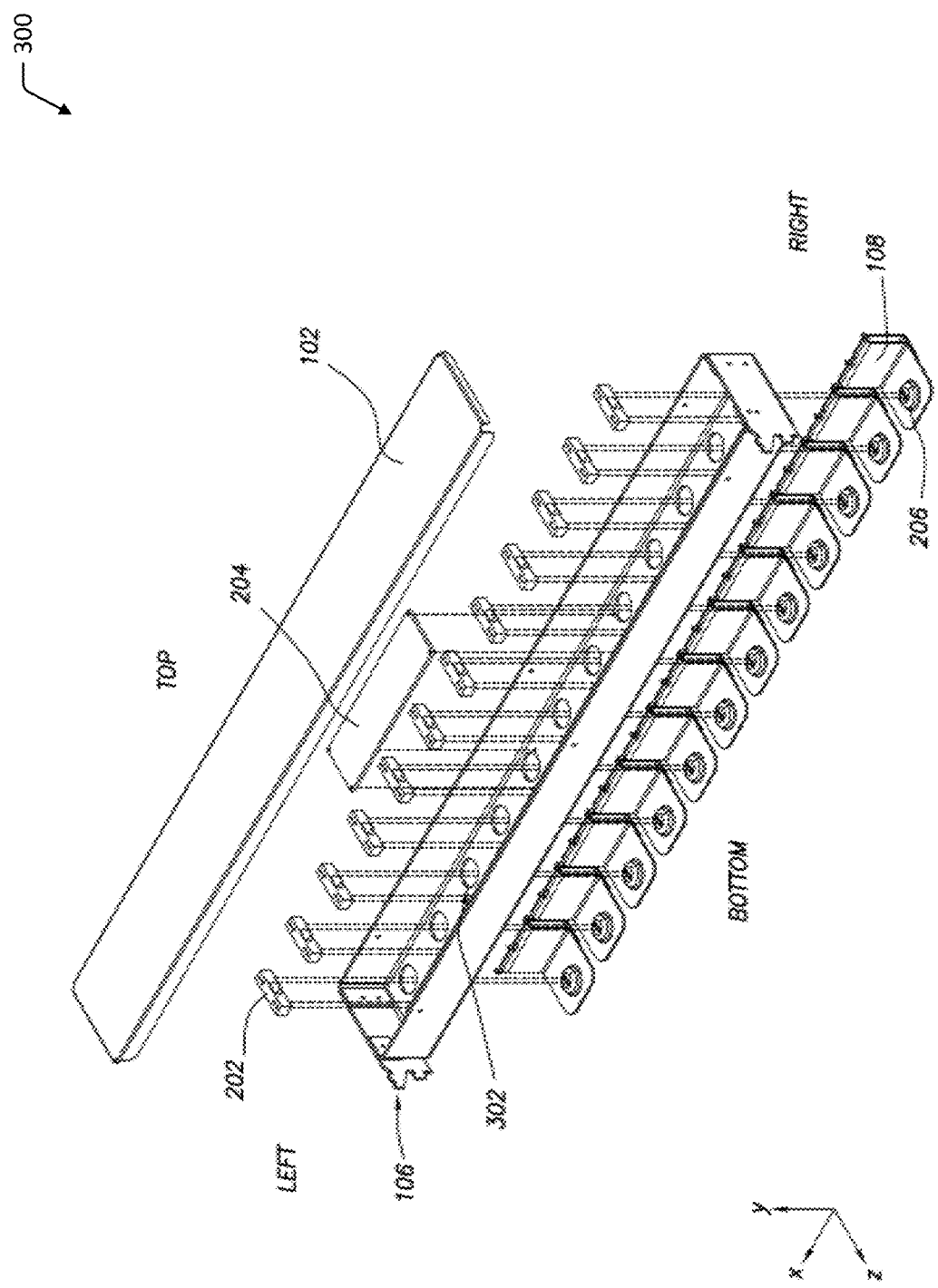
FIG. 3 illustrates an exploded view showing the back of the multi-lane weight measuring device, according to some implementations.

FIG. 3 illustrates an exploded view 300 showing the back of the device 100, according to some implementations. In this view, a plurality of holes 302 or other openings are visible. Each of the weight sensors 202 is arranged such that a first end is affixed to the housing 104 while a second end is aligned with a respective one of the holes 302. For example, the second end of a weight sensor 202 may be positioned over a center of a hole 302. A first end of each bracket 108 extends underneath the housing 104 and is positioned under the hole 302 to align with a respective weight sensor 202.

In some implementations the hole 302 may be sealed using an elastomeric or flexible covering. For example, an elastomeric membrane may cover the hole 302, allowing movement of the bracket 108 and the portion of the weight sensor 202 that the bracket is affixed to. In another example, a skirt may be used to seal the portion of the hole 302 that is not occupied by the bracket 108.

Figure 4:
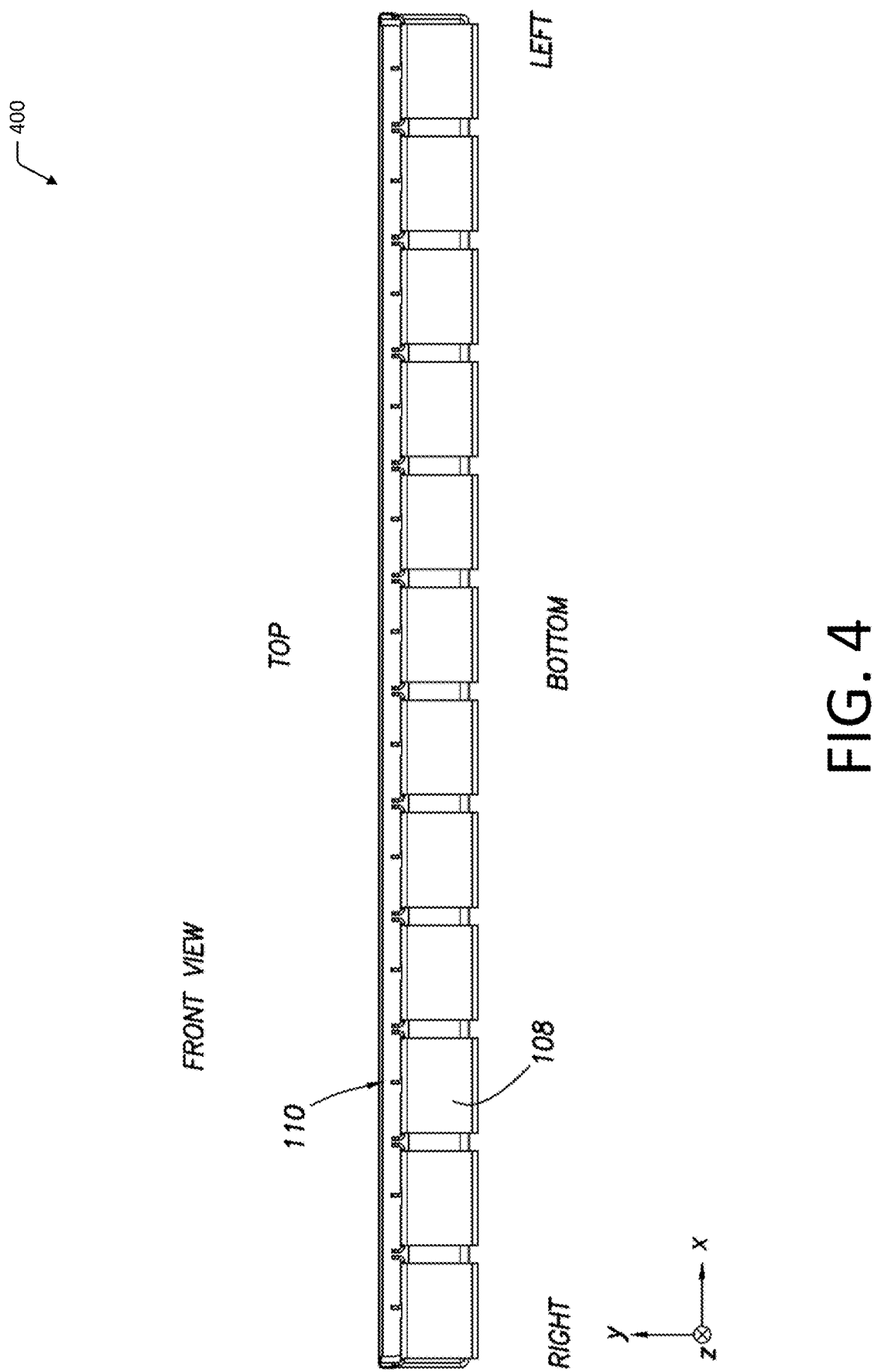
FIG. 4 illustrates a front view of the multi-lane weight measuring device, according to some implementations.

FIG. 4 illustrates a front view 400 of the device 100, according to some implementations. In this view a front of the brackets 108 is visible, as are the lateral retention features 110 that extend upward from the accessory support features of the brackets 108.

Figure 5:
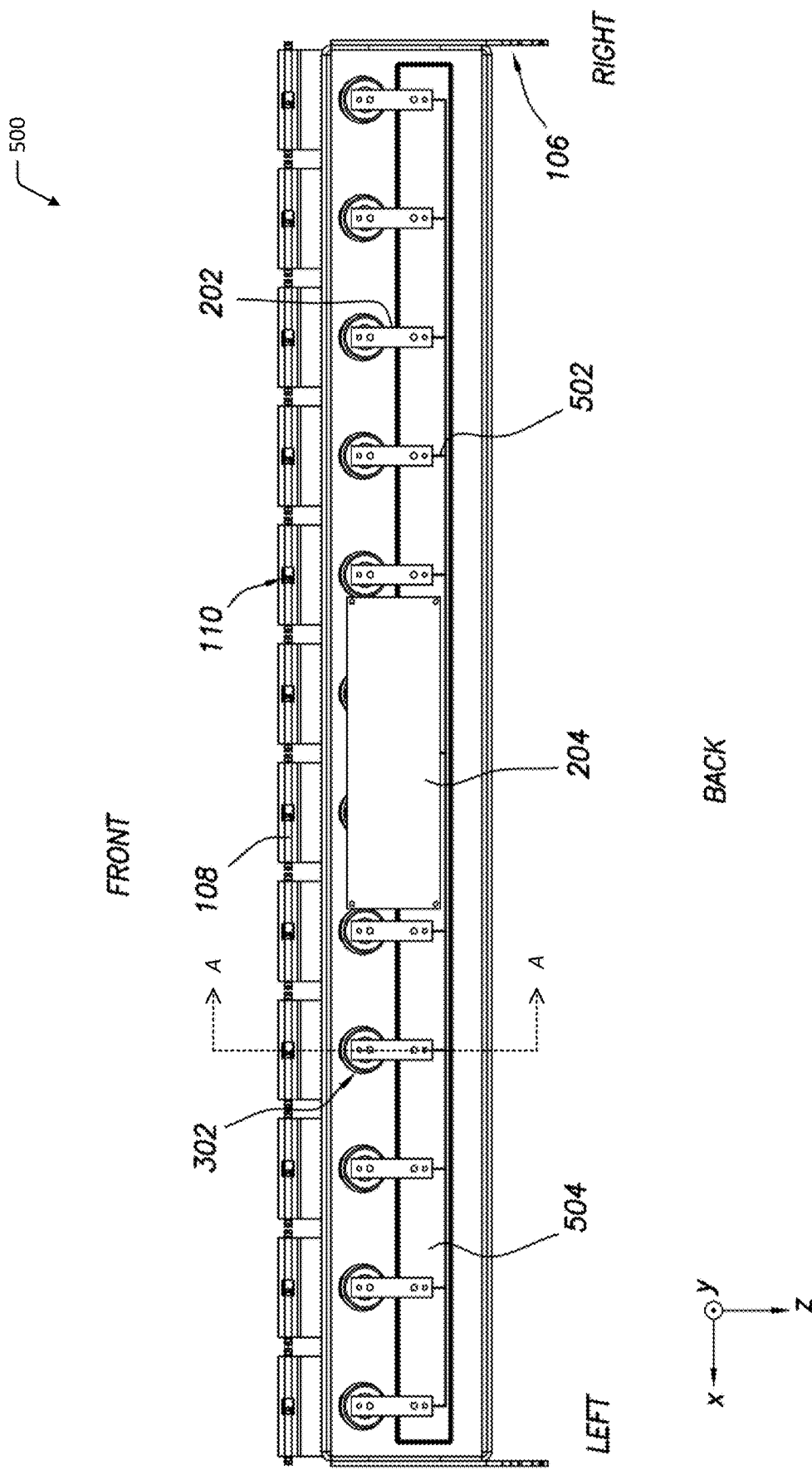
FIG. 5 illustrates a top view of the multi-lane weight measuring device with the cover removed, according to some implementations.

FIG. 5 illustrates a top view 500 of the device 100 with the cover 102 removed, according to some implementations. The brackets 108 are visible, with the lateral retention features 110 that extend upward from the upper surfaces of the accessory support feature.

In this view, the hole 302 associated with each weight sensor 202 is visible. In this implementation, each weight sensor 202 and corresponding bracket 108 is associated with an individual hole 302. In other implementations one or more larger holes 302 may be used. For example, instead of individual holes 302 for each bracket 108, a rectangular cutout may be made in the bottom of the housing 104 and shared by all of the brackets 108 and weight sensors 202.

Also shown in this figure is wiring 502 that connects the weight sensors 202 to the circuitry 204. For example, the wiring 502 may comprise a wiring harness, flexible printed circuit, and so forth.

A mounting feature 504 is also shown. The mounting feature 504 is raised a distance relative to the rest of the bottom of the housing 104. For example, the mounting feature 504 may comprise a surface that is raised relative to the bottom of the housing 104. In one implementation, the mounting feature 504 may comprise a portion of the bottom of the housing 104 extending from a left side of the housing 104 to a right side of the housing 104 that has been stamped or embossed to produce the raised surface, relative to the bottom of the housing 104. In another implementation, instead of a single mounting feature 504 as shown here, separate mounting features 504 may be provided. In another example, the mounting feature 504 may comprise a plate or other structure that is affixed to the bottom of the housing 104 and acts as a spacer.

The mounting feature 504 provides a gap or distance between a bottom of the weight sensor 202 and the inner surface of the bottom of the housing 104. This distance provides clearance for the end of the weight sensor 202. A first end of the weight sensor 202 is affixed to the mounting feature 504 while a second end of the weight sensor 202 is attached to the protrusion 206 on the first end of the bracket 108. As the load increases on the bracket 108, the second end of the weight sensor 202 may be displaced towards the bottom of the housing 104. The clearance provided by the mounting feature 504 provides room for the displaced portion of the weight sensor 202 to move.

Figure 7:
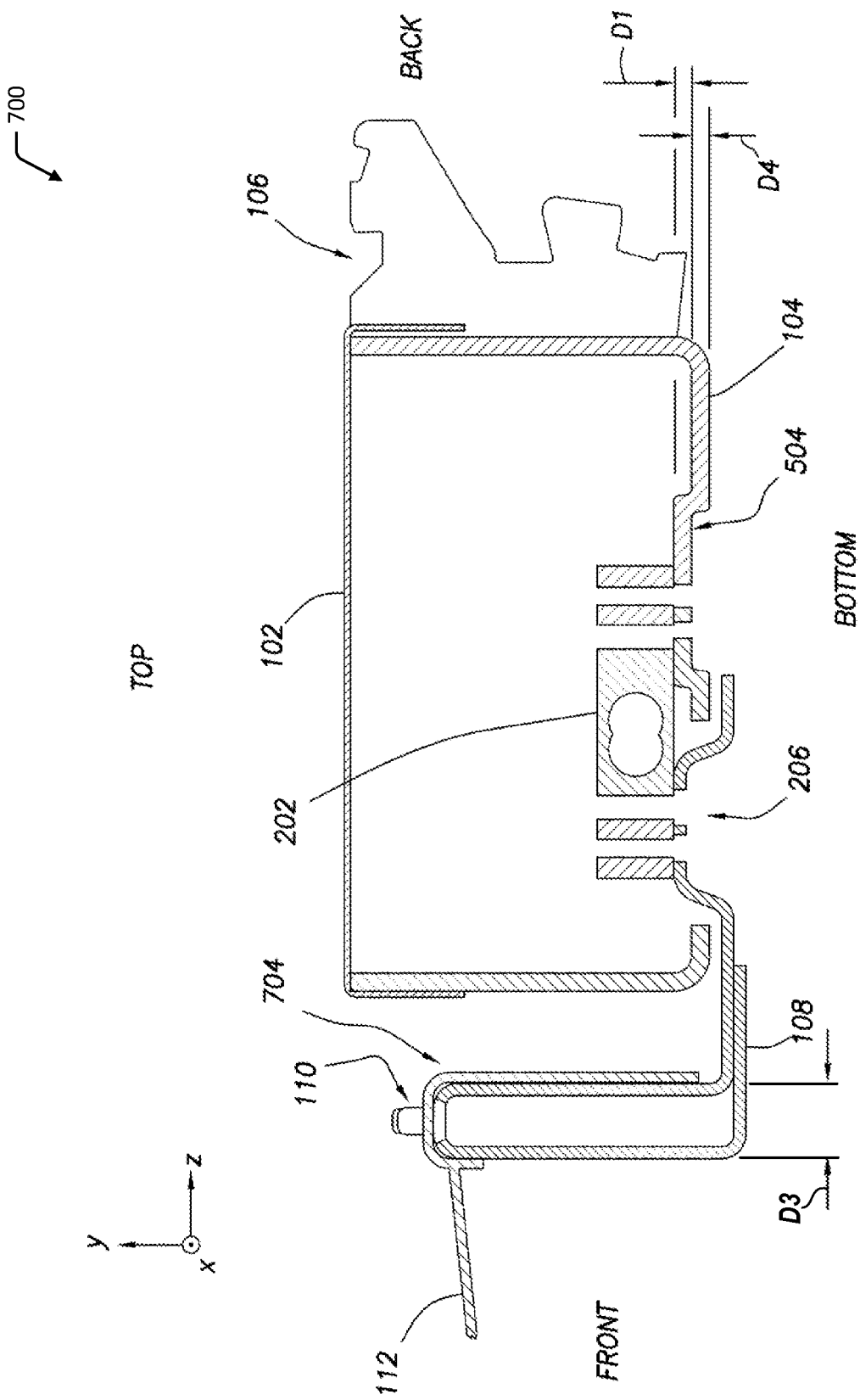
FIG. 7 illustrates a cross-section view of the multi-lane weight measuring device, according to some implementations.

Also shown is a cross-section line A-A indicative of the location of the cross section shown in FIG. 7.

Figure 6:
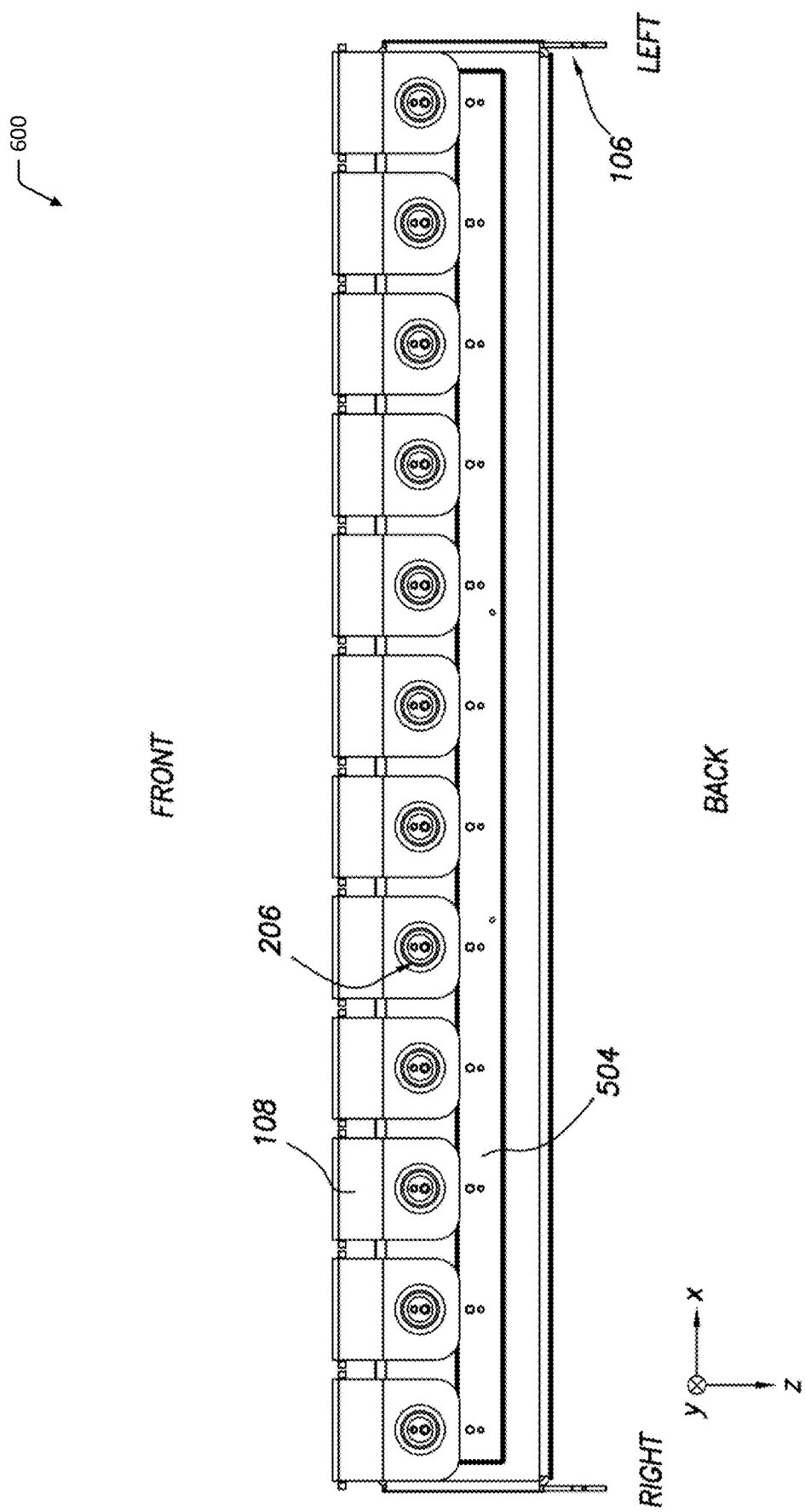
FIG. 6 illustrates a bottom view of the multi-lane weight measuring device, according to some implementations.

FIG. 6 illustrates a bottom view 600 of the device 100, according to some implementations. In this view, the bottom of the housing 104, the brackets 108, and the mounting feature 504 are visible. Also visible are the protrusions 206 on the brackets 108 that are affixed to the weight sensors 202.

FIG. 7 illustrates a cross-section 700 view of the device 100 along line A-A as shown in FIG. 5, according to some implementations. The housing 104 is shown, with the cover 102 on top. One or more of the edges of the cover 102 may extend down past an upper edge of the walls formed by the housing 104. By extending the edges of the cover 102 it may improve spill tolerance by directing any material such as a powder or liquid down along the sides of the housing 104, rather than into the interior. Also visible in this view is a shelf hook 106.

The bracket 108 is shown, with a first end having a protrusion 206 that extends upwards through the hole 302 and up into contact with the second end of the weight sensor 202. When the bracket 108 is affixed to the weight sensor 202, a gap D4 is present between a lower side of the housing 104 and an upper side of the bracket 108.

The mounting feature 504 is shown here as an embossed or raised feature having a surface that is a distance D1 above the inner surface of the bottom of the housing 104. As described above, this distance D1 provides room for a portion of the weight sensor 202 to deflect when a load is applied to the second end of the weight sensor 202.

An accessory support feature 702 of the bracket 108 is depicted. The accessory support feature 702 provides a structure for a bracket engagement feature 704 to mechanically engage. Once so engaged, the accessory 112 is supported by the bracket 108. For example, the accessory support feature 702 may comprise a portion of the bracket 108 that is generally rectangular in cross section and having a thickness D3. A space is provided between the back of the accessory support feature 702 and a front of the housing 104. This space provides room for the bracket engagement feature 704 to pass during installation and removal. The accessory support feature 702 may comprise a portion of the bracket 108 that has been bent, folded, or formed to provide an approximately rectangular cross section as shown here. In other implementations, other cross sections may be provided. In this illustration, the bracket engagement feature 704 has a front lip that extends down at least a portion of a front of the accessory support feature 702 and a rear portion that extends down at least a portion of a rear of the accessory support feature 702.

Also shown is the lateral retention feature 110 that prevents the accessory 112 from excessive sliding along the accessory support feature 702.

Figure 8:
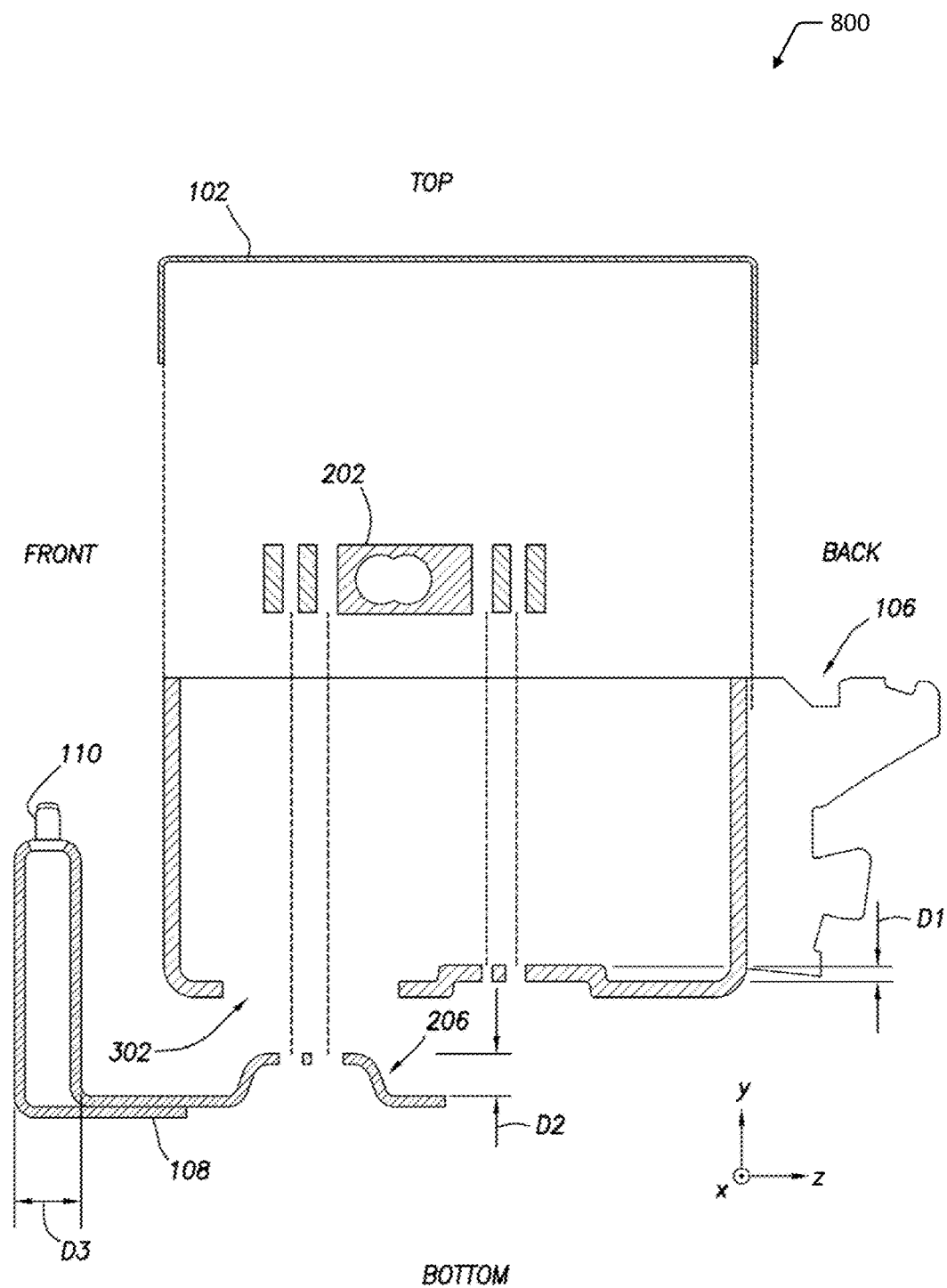
FIG. 8 illustrates an exploded view of the cross-section of FIG. 7, according to some implementations.

FIG. 8 illustrates an exploded view 800 of the cross-section of FIG. 7, according to some implementations. In this view, a distance D2 is depicted, showing a distance between a top surface of the protrusion 206 and a body of the first end of the bracket 108. Also shown is the hole 302 through which at least a portion of the protrusion 206 passes into the housing 104.

In some implementations, such as shown here, the bracket 108 may comprise a single piece of material. For example, in this illustration a single piece of steel may be punched, stamped, bent, or subjected to other metal fabrication techniques to produce the features shown.

Figure 9:
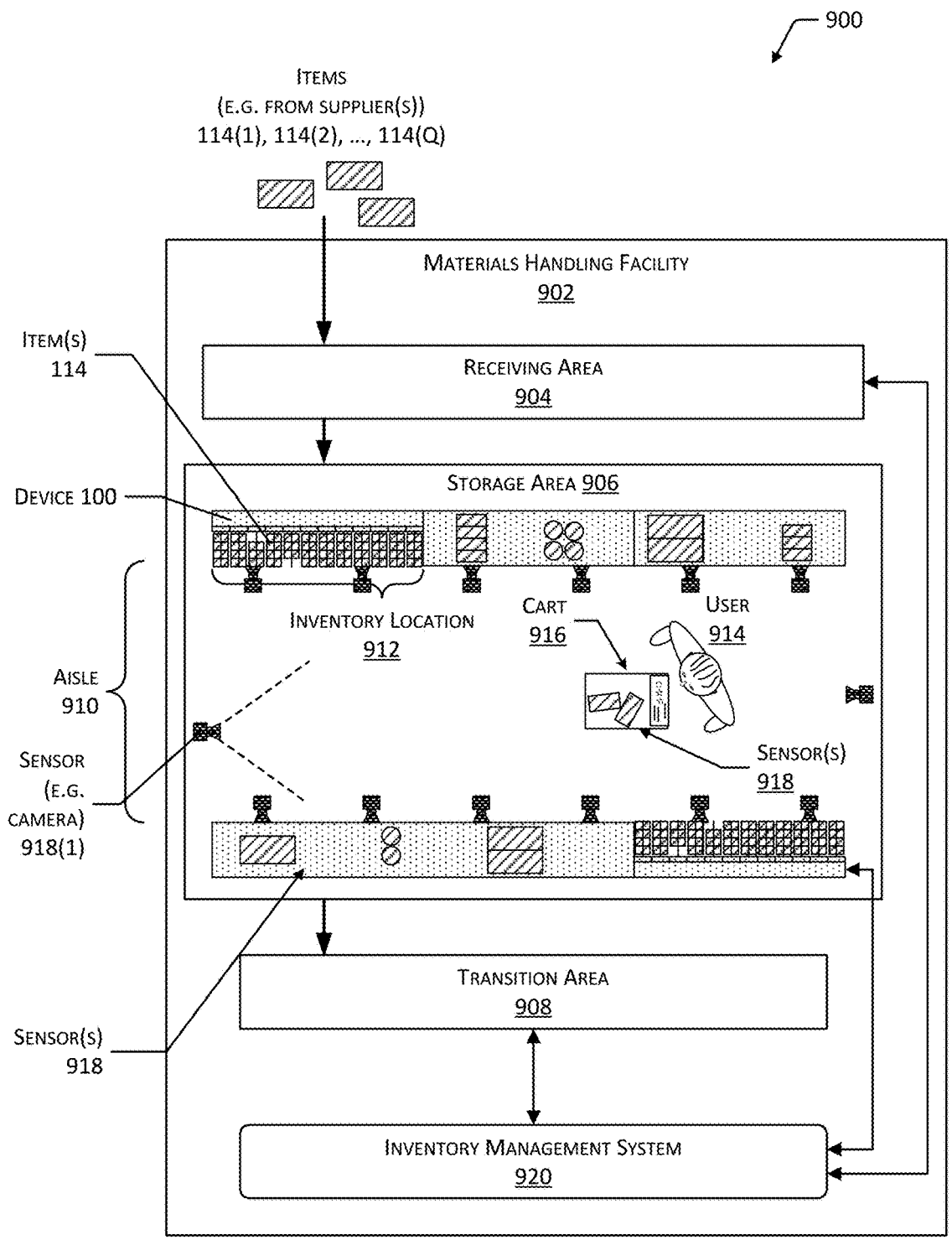
FIG. 9 is a block diagram illustrating a materials handling facility (facility) using the device, according to some implementations.

FIG. 9 is a block diagram 900 illustrating a material handling facility (facility) 902 using the system 100, according to some implementations. A facility 902 comprises one or more physical structures or areas within which one or more items 114(1), 114(2), ..., 114(Q) may be held. The items 114 may comprise physical goods, such as books, pharmaceuticals, repair parts, electronic gear, and so forth.

The facility 902 may include one or more areas designated for different functions with regard to inventory handling. In this illustration, the facility 902 includes a receiving area 904, a storage area 906, and a transition area 908.

The receiving area 904 may be configured to accept items 114, such as from suppliers, for intake into the facility 902. For example, the receiving area 904 may include a loading dock at which trucks or other freight conveyances unload the items 114. In some implementations, the items 114 may be processed, at the receiving area 904, to generate at least a portion of the item data 1132. For example, an item 114 may be weighed, imaged or otherwise scanned to develop reference images or representations of the item 114 at the receiving area 904.

The storage area 906 is configured to store the items 114. The storage area 906 may be arranged in various physical configurations. In one implementation, the storage area 906 may include one or more aisles 910. The aisle 910 may be configured with, or defined by, inventory locations 912 on one or both sides of the aisle 910. The inventory locations 912 may include one or more of a platform, a rack, a case, a cabinet, a bin, a floor location, or other suitable storage mechanisms for holding, supporting, or storing the items 114. For example, the inventory locations 912 may comprise the device 100 with multiple accessories 112 that provide a plurality of lanes.

The inventory locations 912 may be affixed to the floor or another portion of the structure of the facility 902. The inventory locations 912 may also be movable such that the arrangements of aisles 910 may be reconfigurable. In some implementations, the inventory locations 912 may be configured to move independently of an outside operator. For example, the inventory locations 912 may comprise a rack with a power source and a motor, operable by a computing device to allow the rack to move from one location within the facility 902 to another.

One or more users 914(1), 914(2), . . . , 914(U) and carts 916(1), 916(2), . . . , 916(T) or other material handling apparatus may move within the facility 902. For example, the user 914 may move about within the facility 902 to pick or place the items 114 in various inventory locations 912, placing them in the cart 916 for ease of transport. The cart 916 is configured to carry or otherwise transport one or more items 114. For example, the cart 916 may include a basket, cart, bag, bin, and so forth. In other implementations, other material handling apparatuses such as robots, forklifts, cranes, aerial drones, and so forth, may move about the facility 902 picking, placing, or otherwise moving the items 114. For example, a robot may pick an item 114 from a first inventory location 912(1) and move the item 114 to a second inventory location 912(2).

While the storage area 906 is depicted as having one or more aisles 910, inventory locations 912 storing the items 114, sensors 918, and so forth, it is understood that the receiving area 904, the transition area 908, or other areas of the facility 902 may be similarly equipped. Furthermore, the arrangement of the various areas within the facility 902 are depicted functionally rather than schematically. For example, in some implementations, multiple different receiving areas 904, storage areas 906, and transition areas 908 may be interspersed rather than segregated in the facility 902.

The facility 902 may include, or be coupled to, an inventory management system 920 described above. The inventory management system 920 is configured to interact with the user 914 or devices such as sensors 918, robots, material handling equipment, computing devices, and so forth, in one or more of the receiving area 904, the storage area 906, or the transition area 908.

During operation of the facility 902, the weight sensors 202 and other sensors 918 may be configured to provide sensor data 1126, or information based on the sensor data 1126, to the inventory management system 920. In addition to data obtained from the weight sensors 202 in the device 100, the sensor data 1126 may include image data, non-image data, and so forth. The sensors 918 may include, but are not limited to, weight sensors 202, cameras 918(1), and so forth. The sensors 918 may be stationary or mobile, relative to the facility 902. For example, the facility 902 may include cameras 918(1) to obtain images of the user 914 or other objects in the facility 902. In another example, the inventory locations 912 may contain weight sensors 202 to acquire weight sensor data of items 114 stowed therein, cameras 918(1) to acquire images of picking or placement of items 114 on shelves, and so forth. The sensors 918 are described in more detail below with regard to FIG. 10.

The inventory management system 920 or other systems may use the sensor data 1126 to track the location of objects within the facility 902, movement of the objects, or provide other functionality. Objects may include, but are not limited to, items 114, users 914, carts 916, and so forth. For example, a series of images acquired by the cameras 918(1) may indicate removal by the user 914 of an item 114 from a particular accessory 112 or other location at the inventory location 912 and placement of the item 114 on or at least partially within the cart 916.

The facility 902 may be configured to receive different kinds of items 114 from various suppliers and to store them until a customer orders or retrieves one or more of the items 114. A general flow of items 114 through the facility 902 is indicated by the arrows of FIG. 9. Specifically, as illustrated in this example, items 114 may be received from one or more suppliers, such as manufacturers, distributors, wholesalers, and so forth, at the receiving area 904. In various implementations, the items 114 may include merchandise, commodities, perishables, or any suitable type of item 114, depending on the nature of the enterprise that operates the facility 902.

Upon being received from a supplier at the receiving area 904, the items 114 may be prepared for storage in the storage area 906. For example, in some implementations, items 114 may be unpacked or otherwise rearranged. The inventory management system 920 may include one or more software applications executing on a computer system to provide inventory management functions. These inventory management functions may include maintaining information indicative of the type, quantity, condition, cost, location, weight, or any other suitable parameters with respect to the items 114. The items 114 may be stocked, managed, or dispensed in terms of countable units, individual units, or multiple units, such as packages, cartons, crates, pallets, or other suitable aggregations. Alternatively, some items 114, such as bulk products, commodities, and so forth, may be stored in continuous or arbitrarily divisible amounts that may not be inherently organized into countable units. Such items 114 may be managed in terms of a measurable quantity such as units of length, area, volume, weight, time, duration, or other dimensional properties characterized by units of measurement. Generally speaking, a quantity of an item 114 may refer to either a countable number of individual or aggregate units of an item 114 or a measurable amount of an item 114, as appropriate.

After arriving through the receiving area 904, items 114 may be stored within the storage area 906. In some implementations, like items 114 may be stored or displayed together in the inventory locations 912 such as in bins, on shelves, hanging from pegboards, and so forth. In this implementation, all items 114 of a given kind are stored in one inventory location 912. In other implementations, like items 114 may be stored in different inventory locations 912. For example, to optimize retrieval of certain items 114 having frequent turnover within a large physical facility 902, those items 114 may be stored in several different inventory locations 912 to reduce congestion that might occur at a single inventory location 912.

When a customer order specifying one or more items 114 is received, or as a user 914 progresses through the facility 902, the corresponding items 114 may be selected or "picked" from the inventory locations 912 containing those items 114. In various implementations, item picking may range from manual to completely automated picking. For example, in one implementation, a user 914 may have a list of items 114 they desire and may progress through the facility 902 picking items 114 from inventory locations 912 within the storage area 906 and placing those items 114 into a cart 916. In other implementations, employees of the facility 902 may pick items 114 using written or electronic pick lists derived from customer orders. These picked items 114 may be placed into the cart 916 as the employee progresses through the facility 902.

After items 114 have been picked, the items 114 may be processed at a transition area 908. The transition area 908 may be any designated area within the facility 902 where items 114 are transitioned from one location to another or from one entity to another. For example, the transition area 908 may be a packing station within the facility 902. When the item 114 arrives at the transition area 908, the item 114 may be transitioned from the storage area 906 to the packing station. Information about the transition may be maintained by the inventory management system 920.

In another example, if the items 114 are departing the facility 902, a list of the items 114 may be obtained and used by the inventory management system 920 to transition responsibility for, or custody of, the items 114 from the facility 902 to another entity. For example, a carrier may accept the items 114 for transport with that carrier accepting responsibility for the items 114 indicated in the list. In another example, a user 914 may purchase or rent the items 114 and remove the items 114 from the facility 902. During use of the facility 902, the user 914 may move about the facility 902 to perform various tasks, such as picking or placing the items 114 in the inventory locations 912.

To facilitate operation of the facility 902, the inventory management system 920 is configured to use the sensor data 1126, such as data from weight sensors 202, image data, and other information such as item data 1132, physical layout data 1134, and so forth, to generate interaction data 1138.

The interaction data 1138 may provide information about an interaction, such as a pick of an item 114 from the inventory location 912, a place of an item 114 to the inventory location 912, a touch made to an item 114 at the inventory location 912, a gesture associated with an item 114 at the inventory location 912, and so forth. The interaction data 1138 may include one or more of the type of interaction, interaction location identifier indicative of where from the inventory location 912 the interaction took place, item identifier, quantity change to the item 114, user identifier, and so forth. The interaction data 1138 may then be used to further update the item data 1132. For example, the quantity of items 114 on hand at a particular accessory 112 may be changed based on an interaction that picks or places one or more items 114.

The inventory management system 920 may perform other operations, determining inventory to restock, determining user billing data, and so forth.

Figure 10:
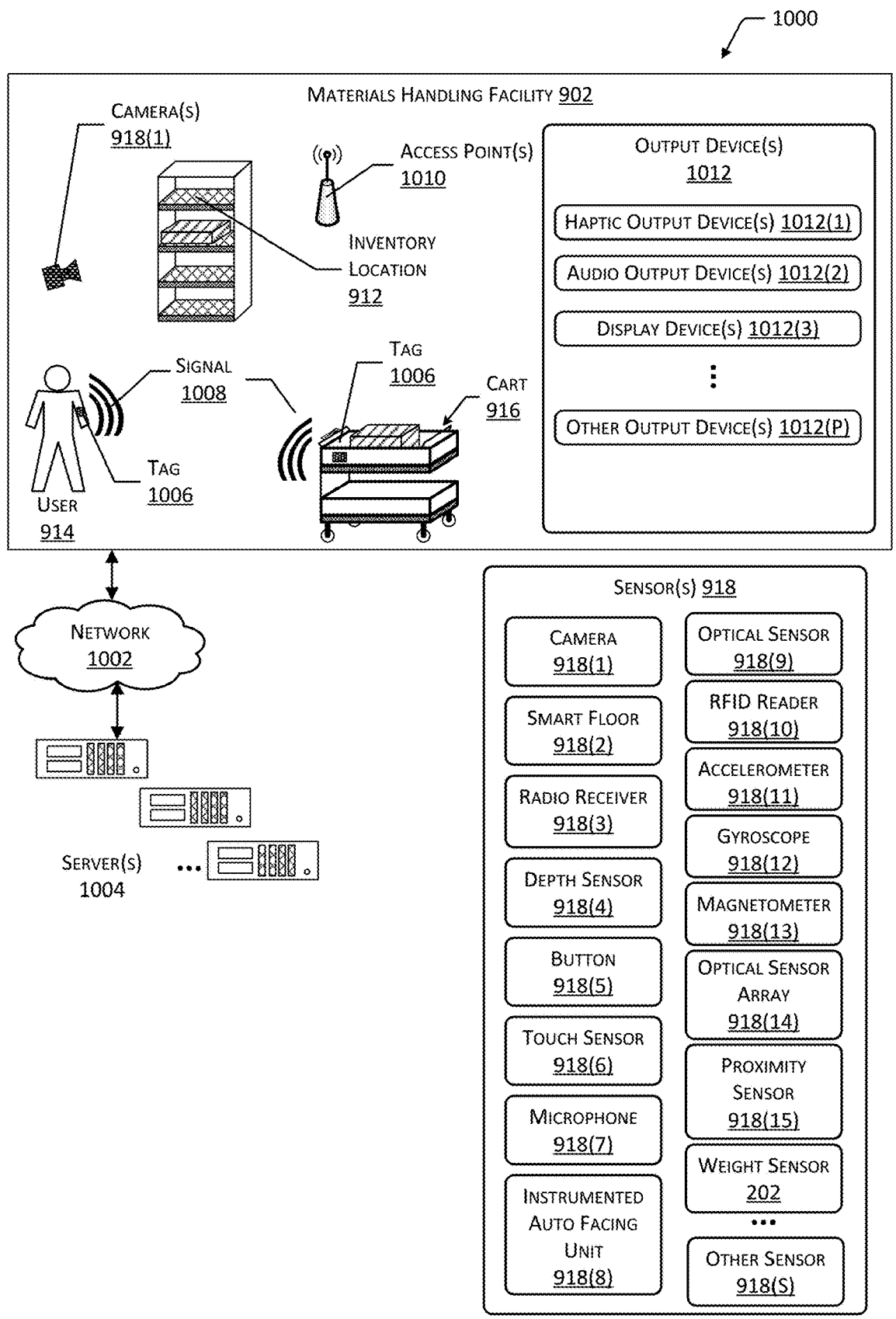
FIG. 10 is a block diagram illustrating additional details of the facility, according to some implementations.

FIG. 10 is a block diagram 1000 illustrating additional details of the facility 902, according to some implementations. The facility 902 may be connected to one or more networks 1002, which in turn connect to one or more computing devices, such as servers 1004. The network 1002 may include private networks such as an institutional or personal intranet, public networks such as the Internet, or a combination thereof. The network 1002 may utilize wired technologies (e.g., wires, fiber optic cables, and so forth), wireless technologies (e.g., radio frequency, infrared, acoustic, optical, and so forth), or other connection technologies. The network 1002 is representative of any type of communication network, including one or more of data networks or voice networks. The network 1002 may be implemented using wired infrastructure (e.g., copper cable, fiber optic cable, and so forth), a wireless infrastructure (e.g., cellular, microwave, satellite, and so forth), or other connection technologies.

The servers 1004 may be configured to execute one or more modules or software applications associated with the inventory management system 920 or other systems. While the servers 1004 are illustrated as being in a location outside of the facility 902, in other implementations, at least a portion of the servers 1004 may be located at the facility 902. The servers 1004 are discussed in more detail below with regard to FIG. 11.

The users 914, the carts 916, items 114, or other objects in the facility 902 may be equipped with one or more tags 1006. The tags 1006 may be configured to emit a signal 1008. In one implementation, the tag 1006 may be a radio frequency identification (RFID) tag 1006 configured to emit an RF signal 1008 upon activation by an external signal. For example, the external signal may comprise a radio frequency signal or a magnetic field configured to energize or activate the RFID tag 1006. In another implementation, the tag 1006 may comprise a transmitter and a power source configured to power the transmitter. For example, the tag 1006 may comprise a Bluetooth Low Energy (BLE) transmitter and battery. In other implementations, the tag 1006 may use other techniques to indicate presence of the tag 1006. For example, an acoustic tag 1006 may be configured to generate an ultrasonic signal 1008, which is detected by corresponding acoustic receivers. In yet another implementation, the tag 1006 may be configured to emit an optical signal 1008.

The inventory management system 920 may be configured to use the tags 1006 for one or more of identification of the object, determining a location of the object, and so forth. For example, the users 914 may wear tags 1006, the carts 916 may have tags 1006 affixed, items 114 may have tags 1006 affixed to their packaging, and so forth, which may be read and, based at least in part on signal strength, used to determine one or more of identity or location.

Generally, the inventory management system 920 or other systems associated with the facility 902 may include any number and combination of input components, output components, and servers 1004.

The one or more sensors 918 may be arranged at one or more locations within the facility 902. For example, the sensors 918 may be mounted on or within a floor, wall, at a ceiling, at an inventory location 912, on a cart 916, may be carried or worn by a user 914, and so forth.

The sensors 918 may include one or more cameras 918(1) or other imaging sensors. The one or more cameras 918(1) may include imaging sensors configured to acquire images of a scene. The cameras 918(1) are configured to detect light in one or more wavelengths including, but not limited to, terahertz, infrared, visible, ultraviolet, and so forth. The cameras 918(1) may comprise charge coupled devices (CCD), complementary metal oxide semiconductor (CMOS) devices, microbolometers, and so forth. The inventory management system 920 may use image data acquired by the cameras 918(1) during operation of the facility 902. For example, the inventory management system 920 may identify items 114, users 914, carts 916, and so forth, based at least in part on their appearance within the image data acquired by the cameras 918(1). The cameras 918(1) may be mounted in various locations within the facility 902. For example, cameras 918(1) may be mounted overhead, on inventory locations 912, may be worn or carried by user 914, may be affixed to carts 916, and so forth.

The sensors 918 may include a smart floor 918(2). The smart floor 918(2) is able to provide information about the location of objects, such as a user 914, carts 916, and so forth. This information may include identifying the object, determining a location of the object, tracking the object, and so forth. The smart floor 918(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 918(2) may comprise sensing elements, or segments. Each segment may include an antenna that is coupled to one or more of a transmitter or a receiver. During operation, the segment may transmit an electromagnetic signal 1008 that is radiated by the antenna, receive an electromagnetic signal that is acquired by the antenna, or both. In some implementations the smart floor 918(2) may operate as a physically large touch sensor that is deployed at floor level. The electromagnetic signals to provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 918(2) may be used to provide object representation movement data. For example, the output from the segments obtained during a particular window of time may be processed in a fashion similar to the image data.

One or more radio receivers 918(3) may also be included as sensors 918. In some implementations, the radio receivers 918(3) may be part of transceiver assemblies. The radio receivers 918(3) may be configured to acquire RF signals 1008 associated with RFID, Wi-Fi, Bluetooth, ZigBee, 4G, LTE, or other wireless data transmission technologies. The radio receivers 918(3) may provide information associated with data transmitted via radio frequencies, signal strength of RF signals 1008, and so forth. For example, information from the radio receivers 918(3) may be used by the inventory management system 920 to determine a location of an RF source, such as a transmitter carried by the user 914, a transmitter on the cart 916, a tag 1006 on the item 114, and so forth.

One or more depth sensors 918(4) may also be included in the sensors 918. The depth sensors 918(4) are configured to acquire spatial or three-dimensional (3D) data, such as depth information, about objects within a field-of-view (FOV). The depth sensors 918(4) may include range cameras, lidar systems, sonar systems, radar systems, structured light systems, stereo vision systems, optical interferometry systems, and so forth. The inventory management system 920 may use the 3D data acquired by the depth sensors 918(4) to identify objects, determine a location of an object in 3D real space, identify user 914, and so forth.

One or more buttons 918(5) may be configured to accept input from the user 914. The buttons 918(5) may comprise mechanical, capacitive, optical, or other mechanisms. For example, the buttons 918(5) may comprise mechanical switches configured to accept an applied force from a touch of the user 914 to generate an input signal. The inventory management system 920 may use data from the buttons 918(5) to receive information from the user 914. For example, the cart 916 may be configured with a button 918(5) to accept input from the user 914 and send information indicative of the input to the inventory management system 920.

The sensors 918 may include one or more touch sensors 918(6). The touch sensors 918(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 920 may use data from the touch sensors 918(6) to receive information from the user 914. For example, the touch sensor 918(6) may be integrated with the cart 916 to provide a touchscreen with which the user 914 may select, from a menu, one or more particular items 114 for picking, enter a manual count of items 114 at an inventory location 912, and so forth.

One or more microphones 918(7) may be configured to acquire information indicative of sound present in the environment. In some implementations, arrays of microphones 918(7) may be used. These arrays may implement beamforming techniques to provide for directionality of gain. The inventory management system 920 may use the one or more microphones 918(7) to acquire information from acoustic tags 1006, accept voice input from the user 914, determine ambient noise level, and so forth.

The sensors 918 may include instrumented auto facing units (IAFUs) 918(8). The IAFU 918(8) may comprise a position sensor configured to provide data indicative of displacement of a pusher. As an item 114 is removed from the IAFU 918(8), the pusher moves, such as under the influence of a spring, and pushes the remaining items 114 in the IAFU 918(8) to the front of the inventory location 912. By using data from the position sensor, and given item data 1132 such as a depth of an individual item 114, a count may be determined, based on a change in position data. For example, if each item 114 is 1 inch deep, and the position data indicates a change of 10 inches, the quantity held by the IAFU 918(8) may have changed by 10 items 114. This count information may be used to confirm or provide a cross check for a count obtained by other means, such as analysis of the sensor data 1126 from the weight sensors 202.

The sensors 918 may include one or more optical sensors 918(9). The optical sensors 918(9) may be configured to provide data indicative of one or more of color or intensity of light impinging thereupon. For example, the optical sensor 918(9) may comprise a photodiode and associated circuitry configured to generate a signal 1008 or data indicative of an incident flux of photons. As described below, the optical sensor array 918(14) may comprise a plurality of the optical sensors 918(9). The optical sensors 918(9) may include photodiodes, photoresistors, photovoltaic cells, quantum dot photoconductors, bolometers, pyroelectric infrared detectors, and so forth. For example, the optical sensor 918(9) may use germanium photodiodes to detect infrared light.

One or more radio frequency identification (RFID) readers 918(10), near field communication (NFC) systems, and so forth, may be included as sensors 918. For example, the RFID readers 918(10) may be configured to read the RF tags 1006. Information acquired by the RFID reader 918(10) may be used by the inventory management system 920 to identify an object associated with the RF tag 1006 such as the item 114, the user 914, the cart 916, and so forth. For example, based on information from the RFID readers 918(10) detecting the RF tag 1006 at a particular inventory location, an item 114 being placed or picked may be determined.

The sensors 918 may include one or more accelerometers 918(11), which may be worn or carried by the user 914, mounted to the cart 916, and so forth. The accelerometers 918(11) may provide information such as the direction and magnitude of an imposed acceleration. Data such as rate of acceleration, determination of changes in direction, speed, and so forth, may be determined using the accelerometers 918(11).

A gyroscope 918(12) may provide information indicative of rotation of an object affixed thereto. For example, the cart 916 or other objects may be equipped with a gyroscope 918(12) to provide data indicative of a change in orientation of the object.

A magnetometer 918(13) may be used to determine an orientation by measuring ambient magnetic fields, such as the terrestrial magnetic field. The magnetometer 918(13) may be worn or carried by the user 914, mounted to the cart 916, and so forth. For example, the magnetometer 918(13) mounted to the cart 916 may act as a compass and provide information indicative of which direction the cart 916 is oriented.

An optical sensor array 918(14) may comprise one or optical sensors 918(9). The optical sensors 918(9) may be arranged in a regular, repeating, or periodic two-dimensional arrangement such as a grid. The optical sensor array 918(14) may generate image data. For example, the optical sensor array 918(14) may be arranged within or below an inventory location 912 and obtain information about shadows of items 114, hand of the user 914, and so forth.

The sensors 918 may include proximity sensors 918(15) used to determine presence of an object, such as the user 914, the cart 916, and so forth. The proximity sensors 918(15) may use optical, electrical, ultrasonic, electromagnetic, or other techniques to determine a presence of an object. In some implementations, the proximity sensors 918(15) may use an optical emitter and an optical detector to determine proximity. For example, an optical emitter may emit light, a portion of which may then be reflected by the object back to the optical detector to provide an indication that the object is proximate to the proximity sensor 918(15). In other implementations, the proximity sensors 918(15) may comprise a capacitive proximity sensor 918(15) configured to provide an electrical field and determine a change in electrical capacitance due to presence or absence of an object within the electrical field.

The proximity sensors 918(15) may be configured to provide sensor data 1126 indicative of one or more of a presence or absence of an object, a distance to the object, or characteristics of the object. An optical proximity sensor 918(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 918 such as a camera 918(1). Based on an apparent distance between the features of the structured light pattern, the distance to the object may be calculated. Other techniques may also be used to determine distance to the object. In another example, the color of the reflected light may be used to characterize the object, such as skin, clothing, cart 916, and so forth.

The one or more weight sensors 202 are configured to measure the weight of a load, such as the item 114, the cart 916, or other objects. The weight sensors 202 may be configured to measure the weight of the load at one or more of the inventory locations 912, the cart 916, on the floor of the facility 902, and so forth. For example, a platform of the inventory location 912 may include a plurality of weight sensors 202. The weight sensors 202 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 202 may operate as transducers that generate one or more signals based on an applied force, such as that of the load due to gravity. For example, the weight sensor 104 may comprise a load cell having a strain gauge and a structural member that deforms slightly when weight is applied. By measuring a change in the electrical characteristic of the strain gauge, such as capacitance or resistance, the weight may be determined. In another example, the weight sensor 104 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 920 may use the data acquired by the weight sensors 202 to identify an object, determine a change in the quantity of objects, determine a location of an object, maintain shipping records, and so forth.

The sensors 918 may include other sensors 918(S) as well. For example, the other sensors 918(S) may include light curtains, ultrasonic rangefinders, thermometers, barometric sensors, hygrometers, and so forth.

In some implementations, the sensors 918 may include hardware processors, memory, and other elements configured to perform various functions. For example, the cameras 918(1) may be configured to generate image data, send the image data to another device such as the server 1004, and so forth.

The facility 902 may include one or more access points 1010 configured to establish one or more wireless networks. The access points 1010 may use Wi-Fi, NFC, Bluetooth, or other technologies to establish wireless communications between a device and the network 1002. The wireless networks allow the devices to communicate with one or more of the sensors 918, the inventory management system 920, the tag 1006, a communication device of the cart 916, or other devices.

Output devices 1012 may also be provided in the facility 902. The output devices 1012 are configured to generate signals 1008, which may be perceived by the user 914 or detected by the sensors 918. In some implementations, the output devices 1012 may be used to provide illumination of the optical sensor array 918(14).

Haptic output devices 1012(1) are configured to provide a signal 1008 that results in a tactile sensation to the user 914. The haptic output devices 1012(1) may use one or more mechanisms such as electrical stimulation or mechanical displacement to provide the signal 1008. For example, the haptic output devices 1012(1) may be configured to generate a modulated electrical signal, which produces an apparent tactile sensation in one or more fingers of the user 914. In another example, the haptic output devices 1012(1) may comprise piezoelectric or rotary motor devices configured to provide a vibration, which may be felt by the user 914.

One or more audio output devices 1012(2) may be configured to provide acoustic output. The acoustic output includes one or more of infrasonic sound, audible sound, or ultrasonic sound. The audio output devices 1012(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1012(3) may be configured to provide output, which may be seen by the user 914 or detected by a light-sensitive sensor such as a camera 918(1) or an optical sensor 918(9). In some implementations, the display devices 1012(3) may be configured to produce output in one or more of infrared, visible, or ultraviolet light. The output may be monochrome or in color. The display devices 1012(3) may be one or more of emissive, reflective, microelectromechanical, and so forth. An emissive display device 1012(3), such as using LEDs, is configured to emit light during operation. In comparison, a reflective display device 1012(3), such as using an electrophoretic element, relies on ambient light to present an image. Backlights or front lights may be used to illuminate non-emissive display devices 1012(3) to provide visibility of the output in conditions where the ambient light levels are low.

The display devices 1012(3) may be located at various points within the facility 902. For example, the addressable displays may be located on inventory locations 912, carts 916, on the floor of the facility 902, and so forth.

Other output devices 1012(P) may also be present. For example, the other output devices 1012(P) may include scent/odor dispensers, document printers, 3D printers or fabrication equipment, and so forth.

Figure 11:
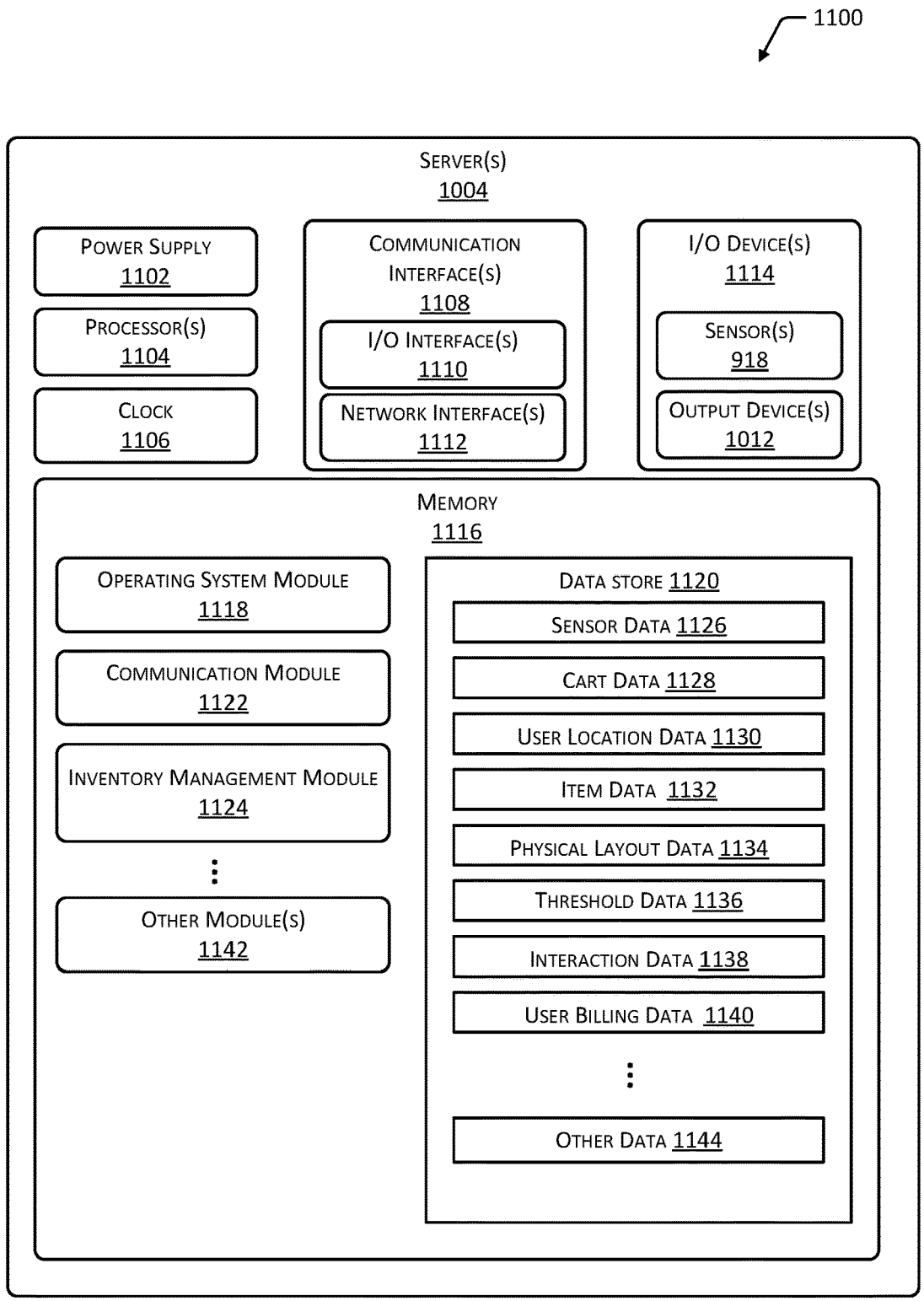
FIG. 11 is a block diagram of a server to support operation of the facility, according to some implementations.

FIG. 11 illustrates a block diagram 1100 of a server 1004 configured to support operation of the facility 902, according to some implementations. The server 1004 may be physically present at the facility 902, may be accessible by the network 1002, or a combination of both. The server 1004 does not require end-user knowledge of the physical location and configuration of the system that delivers the services. Common expressions associated with the server 1004 may include "on-demand computing", "software as a service (SaaS)", "platform computing", "network-accessible platform", "cloud services", "data centers", and so forth. Services provided by the server 1004 may be distributed across one or more physical or virtual devices.

One or more power supplies 1102 may be configured to provide electrical power suitable for operating the components in the server 1004. The one or more power supplies 1102 may comprise batteries, capacitors, fuel cells, photovoltaic cells, wireless power receivers, conductive couplings suitable for attachment to an external power source such as provided by an electric utility, and so forth. The server 1004 may include one or more hardware processors 1104 (processors) configured to execute one or more stored instructions. The processors 1104 may comprise one or more cores. One or more clocks 1106 may provide information indicative of date, time, ticks, and so forth. For example, the processor 1104 may use data from the clock 1106 to associate a particular interaction with a particular point in time.

The server 1004 may include one or more communication interfaces 1108 such as input/output (I/O) interfaces 1110, network interfaces 1112, and so forth. The communication interfaces 1108 enable the server 1004, or components thereof, to communicate with other devices or components. The communication interfaces 1108 may include one or more I/O interfaces 1110. The I/O interfaces 1110 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1110 may couple to one or more I/O devices 1114. The I/O devices 1114 may include input devices such as one or more of a sensor 918, keyboard, mouse, scanner, and so forth. The I/O devices 1114 may also include output devices 1012 such as one or more of a display device 1012(3), printer, audio speakers, and so forth. In some embodiments, the I/O devices 1114 may be physically incorporated with the server 1004 or may be externally placed.

The network interfaces 1112 may be configured to provide communications between the server 1004 and other devices, such as the carts 916, routers, access points 1010, and so forth. The network interfaces 1112 may include devices configured to couple to personal area networks (PANs), local area networks (LANs), wireless local area networks (WLANS), wide area networks (WANs), and so forth. For example, the network interfaces 1112 may include devices compatible with Ethernet, Wi-Fi, Bluetooth, ZigBee, and so forth.

The server 1004 may also include one or more buses or other internal communications hardware or software that allow for the transfer of data between the various modules and components of the server 1004.

As shown in FIG. 11, the server 1004 includes one or more memories 1116. The memory 1116 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1116 provides storage of computer-readable instructions, data structures, program modules, and other data for the operation of the server 1004. A few example functional modules are shown stored in the memory 1116, although the same functionality may alternatively be implemented in hardware, firmware, or as a system on a chip (SoC).

The memory 1116 may include at least one operating system (OS) module 1118. The OS module 1118 is configured to manage hardware resource devices such as the I/O interfaces 1110, the I/O devices 1114, the communication interfaces 1108, and provide various services to applications or modules executing on the processors 1104. The OS module 1118 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1116 may be a data store 1120 and one or more of the following modules. These modules may be executed as foreground applications, background tasks, daemons, and so forth. The data store 1120 may use a flat file, database, linked list, tree, executable code, script, or other data structure to store information. In some implementations, the data store 1120 or a portion of the data store 1120 may be distributed across one or more other devices including the servers 1004, network attached storage devices, and so forth.

A communication module 1122 may be configured to establish communications with one or more of the carts 916, sensors 918, display devices 1012(3), other servers 1004, or other devices. The communications may be authenticated, encrypted, and so forth.

The memory 1116 may store an inventory management module 1124. The inventory management module 1124 is configured to provide the inventory functions as described herein with regard to the inventory management system 920. For example, the inventory management module 1124 may track items 114 between different inventory locations 912, to and from the carts 916, generate restocking orders, direct operation of robots within the facility 902, and so forth. The inventory management module 1124 may access sensor data 1126 such as one or more of weight data from the weight sensors 202, image data, received data, and so forth.

Information used by the inventory management module 1124 may be stored in the data store 1120. For example, the data store 1120 may be used to store the sensor data 1126, cart data 1128, user location data 1130, item data 1132, physical layout data 1134, threshold data 1136, interaction data 1138, user billing data 1140, and so forth.

The cart data 1128 comprises information about the items 114 that are determined to be in the custody of the user 914. For example, the cart data 1128 may indicate the items 114 that are within the cart 916 that is associated with the account of the user 914, currently being carried by the user 914, and so forth. The cart data 1128 may be based at least in part on the interaction data 1138. For example, the interaction data 1138 may be associated with a particular user 914, changing the contents of the cart data 1128 based on the interaction.

The inventory management module 1124 may generate the user location data 1130 that is indicative of the location of the user 914 within the facility 902. For example, the inventory management module 1124 may use image data obtained by the cameras 918(1) to determine a location of the user 914. In other implementations, other techniques may be used for determining the user location data 1130. For example, data from the smart floor 918(2) may be used to determine the location of the user 914. Based on the user location data 1130 and the interaction data 1138, a particular interaction may be associated with an account of a particular user 914. For example, if the user location data 1130 indicates that the user 914 is present in front of inventory location 912(492) at time 17:47:20 and the interaction data 1138 indicates a pick of a quantity of one item 114(D) from bracket 108(7) on device 100(1) of inventory location 912(492) at 17:47:27, the user 914 may be billed for that pick.

The threshold data 1136 comprises the various thresholds used by the system. For example, the threshold data 1136 may specify values for confidence thresholds that are used to determine if a hypothesis is deemed suitable to be used to generate the interaction data 1138.

The inventory management module 1124 may generate user billing data 1140 based on the cart data 1128. For example, when a user 914 leaves the facility 902, the items in the cart data 1128 and their respective quantities may be used to generate user billing data 1140. In some implementations, the user billing data 1140 may be used to bill a payment account associated with the user 914.

The inventory management module 1124 may utilize the physical layout data 1134 during operation. The physical layout data 1134 may provide information indicative of where cameras 918(1), weight sensors 202, antennas for the radio receivers 918(3), inventory locations 912, and so forth are in the facility 902 with respect to one another. For example, the physical layout data 1134 may comprise information representative of a map or floor plan of the facility 902 with relative positions of inventory locations 912 and cameras 918(1).

The inventory management module 1124 may process the sensor data 1126 and generate output data. For example, based on the interaction data 1138, a quantity of a type of item 114 at a particular inventory location 912 may drop below a threshold restocking level. The system may generate output data comprising a restocking order indicative of the inventory location 912, the area, and a quantity needed to replenish stock to a predetermined level. The restocking order may then be used to direct a robot to restock that inventory location 912.

Other modules 1142 may also be present in the memory 1116 as well as other data 1144 in the data store 1120.

The implementations described above are provided for illustration, and not necessarily as limitations. For example, the fixtures may support different numbers of accessories 112, combinations of different accessories 112 on the same fixture, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
a housing having a front side, a back side, a left side, a right side, and a bottom, wherein a left shelf hook extends from the left side away from the back side and a right shelf hook extends from the right side away from the back side;
a first hole and a second hole in the bottom of the housing proximate to the front side, wherein a center of the first hole and a center of the second hole are at a same distance from the front side;
a mounting feature on the bottom that is raised relative to the bottom of the housing and is located between the first hole and the back side and the second hole and the back side and extends from proximate to the first hole to proximate to the second hole;
a first weight sensor having a first end and a second end, wherein the first end of the first weight sensor is affixed to the mounting feature proximate to the first hole;
a second weight sensor having a first end and a second end, wherein the first end of the second weight sensor is affixed to the mounting feature proximate to the second hole;
a first bracket comprising:
a first end, wherein at least a first portion of the first end extends through the first hole and is affixed to the second end of the first weight sensor;
a second end that extends past the front side of the housing, the second end comprising an accessory support feature, wherein the accessory support feature comprises a tab;
a second bracket comprising:
a first end, wherein at least a first portion of the first end extends through the second hole and is affixed to the second end of the second weight sensor; and
a second end that extends past the front side of the housing, the second end comprising an accessory support feature, wherein the accessory support feature comprises a tab; and
a cover that fits atop the housing.

2. The apparatus of claim 1, wherein the first weight sensor and the second weight sensor each comprise a single point load cell.

3. The apparatus of claim 1, further comprising:
a first accessory comprising:
a bracket engagement feature that mechanically engages one or more of the first bracket or the second bracket; and
one or more of a hook, bin, basket, shelf, autofacing unit, or dispenser.

4. The apparatus of claim 1, further comprising circuitry to generate weight data indicative of a load on one or more of the first weight sensor or the second weight sensor.

5. An apparatus comprising:
a housing having a first side and a second side;
a first hole in the first side;
a second hole in the first side;
a first feature on the first side, wherein the first feature provides a first surface at a first distance away from the first side;
a first weight sensor having a first end affixed to a first location on the first feature and a second end that is aligned with the first hole;
a second weight sensor having a first end affixed to a second location on the first feature and a second end that is aligned with the second hole;
a first bracket having a first end that is affixed to the second end of the first weight sensor and a second end that extends beyond the second side, wherein the first weight sensor determines a first weight of a first load on the first bracket; and
a second bracket having a first end that is affixed to the second end of the second weight sensor and a second end that extends beyond the second side, wherein the second weight sensor determines a second weight of a second load on the second bracket.

6. The apparatus of claim 5, wherein the first feature on the first side comprises one or more of:
an embossed portion of the first side, or
a plate that is affixed to the first side.

7. The apparatus of claim 5, wherein:
the housing has a first long axis that extends from a first end to a second end;
the first weight sensor has a second axis that extends from the first end of the first weight sensor to the second end of the first weight sensor; and
wherein the first long axis is perpendicular to the second axis.

8. The apparatus of claim 5, further comprising one or more of:
a spacer between the first end of the first bracket and the second end of the first weight sensor, or
the first end of the first bracket comprising a protrusion that extends through the first hole.

9. The apparatus of claim 5, the first bracket comprising:
an accessory support feature; and
one or more tabs extending from the accessory support feature.

10. The apparatus of claim 5, wherein the first weight sensor comprises a single point load cell.

11. The apparatus of claim 5, wherein the first side comprises a bottom of the housing and the second side comprises a front of the housing; and
wherein the first end of the first bracket is mounted to an underside of the second end of the first weight sensor.

12. The apparatus of claim 5, the housing further comprising a third side, a fourth side, and a fifth side; and
further comprising a cover that encloses the housing.

13. The apparatus of claim 5, the housing further comprising a third side, a fourth side, and a fifth side, wherein the first side, the second side, the third side, the fourth side, and the fifth side are arranged in a rectangular parallelepiped, wherein the housing comprises a single piece of material; and
one or more shelf hooks extending away from the third side of the housing, wherein the third side is opposite the second side.

14. The apparatus of claim 5, further comprising:
circuitry that is connected to the first weight sensor and the second weight sensor, wherein the circuitry generates first weight data indicative of a first load on the first weight sensor and second weight data indicative of a second load on the second weight sensor.

15. The apparatus of claim 5, wherein the first bracket comprises a single piece of material.

16. An apparatus comprising:
a housing having a first side and a second side;
one or more holes in the first side;
a first feature on the first side, wherein the first feature provides a first surface that extends a first distance away from the first side;

a first weight sensor having a first end affixed to the first surface and a second end that is aligned with a first portion of the one or more holes;

a first bracket having a first end that is affixed to the second end of the first weight sensor and a second end that extends beyond the second side, wherein the first weight sensor determines a first weight of a first load on the first bracket;

a second feature on the first side, wherein the second feature provides a second surface that extends a second distance away from the first side;

a second weight sensor having a first end affixed to the second surface and a second end that is aligned with a second portion of the one or more holes; and a second bracket having a first end that is affixed to the second end of the second weight sensor and a second end that extends beyond the second side, wherein the second weight sensor determines a second weight of a second load on the second bracket.

17. The apparatus of claim 16, wherein:

the housing has a first long axis that extends from a first end to a second end;

the first weight sensor has a second axis that extends from the first end of the first weight sensor to the second end of the first weight sensor; and wherein the first long axis is perpendicular to the second axis.

18. The apparatus of claim 16, further comprising one or more of:

a spacer arranged between the first end of the first bracket and the second end of the first weight sensor, or the first end of the first bracket comprising a feature that extends through one of the one or more holes.

19. The apparatus of claim 16, the first bracket comprising:

an accessory support feature; and one or more tabs extending from the accessory support feature.

20. The apparatus of claim 16, the housing further comprising a third side, a fourth side, and a fifth side, wherein the first side, the second side, the third side, the fourth side, and the fifth side are arranged in a rectangular parallelepiped, wherein the housing comprises a single piece of material; and one or more shelf hooks extending away from the third side of the housing, wherein the third side is opposite the second side.

* * * * *